United States Patent

[11] 3,585,912

| [72] | Inventor | Tore Lennart Danielsson<br>Dalgatan 7B, Marsta, Sweden |
|---|---|---|
| [21] | Appl. No. | 811,174 |
| [22] | Filed | Mar. 27, 1969 |
| [45] | Patented | June 22, 1971 |
| [32] | Priority | Mar. 29, 1968 |
| [33] | | Sweden |
| [31] | | 4241/68 |

[54] MATERIAL SPREADING APPARATUS
13 Claims, 9 Drawing Figs.

[52] U.S. Cl. .................................................. 94/46,
239/657
[51] Int. Cl. ........................................................ E01c 19/48
[50] Field of Search ............................................ 239/659,
657; 94/44, 46

[56] References Cited
UNITED STATES PATENTS

| 1,724,043 | 8/1929 | Robb .......................... | 94/46 |
| 1,977,850 | 10/1934 | Heltzel ........................ | 94/46 X |
| 2,439,620 | 4/1948 | Faber .......................... | 94/44 |
| 2,583,108 | 1/1952 | Lewis .......................... | 94/44 |
| 2,774,602 | 12/1956 | Sanderson .................... | 239/657 |
| 3,109,351 | 11/1963 | Dunn ........................... | 94/44 |
| 3,142,490 | 7/1964 | Tift .............................. | 239/663 |
| 3,402,649 | 9/1968 | Guntert ........................ | 94/46 |

Primary Examiner—Jacob L. Nackenoff
Attorney—Spencer and Kaye

ABSTRACT: Apparatus for spreading a material over a large surface has a material feeding unit including a feeder chute adapted to be continuously supplied with the material to be spread and in which a feed screw is rotatably mounted parallel to the longitudinal axis of the chute. The feed screw is arranged to convey the material to be spread into a spreading means provided at one end of the feeder chute. A drive motor is connected to the feed screw to rotate it. The feeding unit is mounted on a driving and supporting unit which is movable in a predetermined direction over the surface to be covered with the material. The unit has guide means on which the feeding unit is mounted for displacement in the direction transverse to the direction of movement of the driving and supporting unit. Drive means are connected to the feeding unit for producing a reciprocating motion of the feeding unit with respect to the guide means.

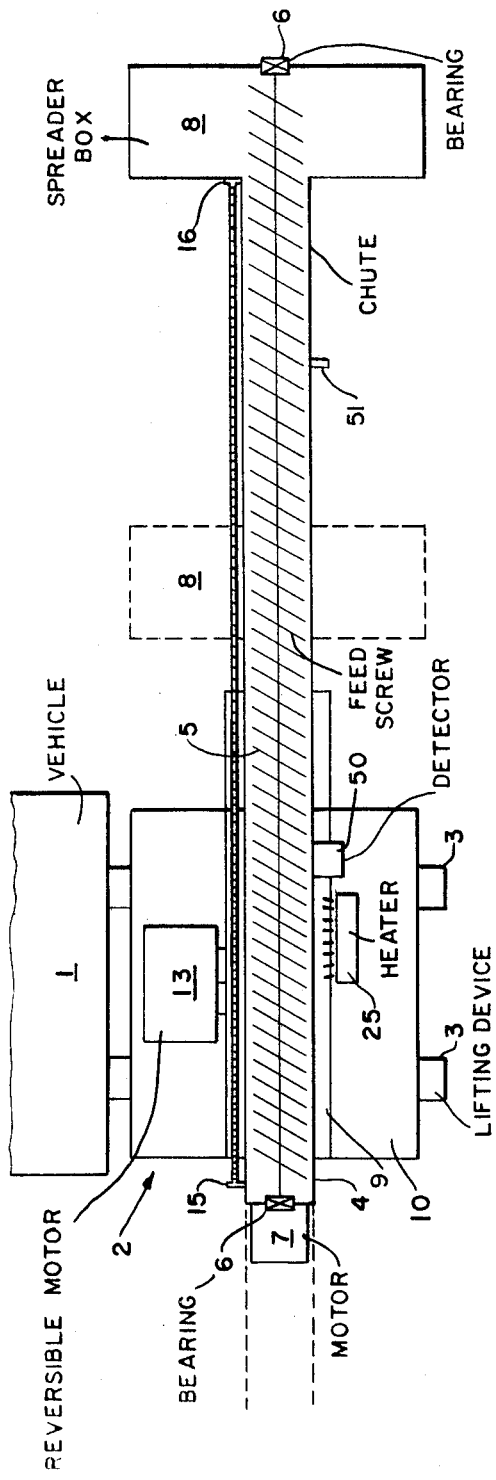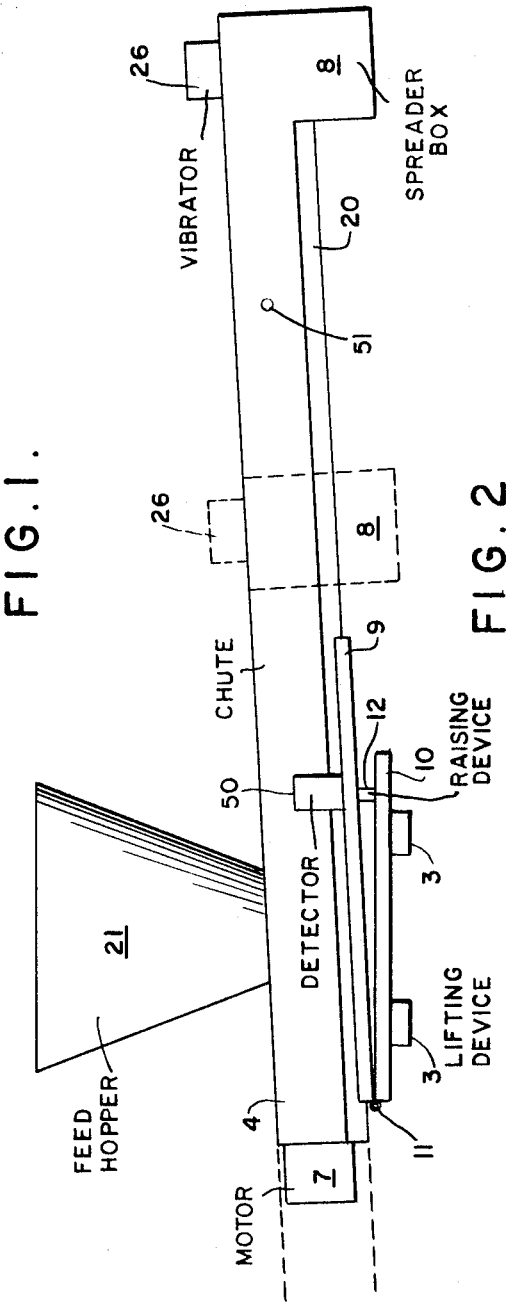

INVENTOR
Tore Lennart Danielsson

BY *Spencer & Kaye*

ATTORNEYS

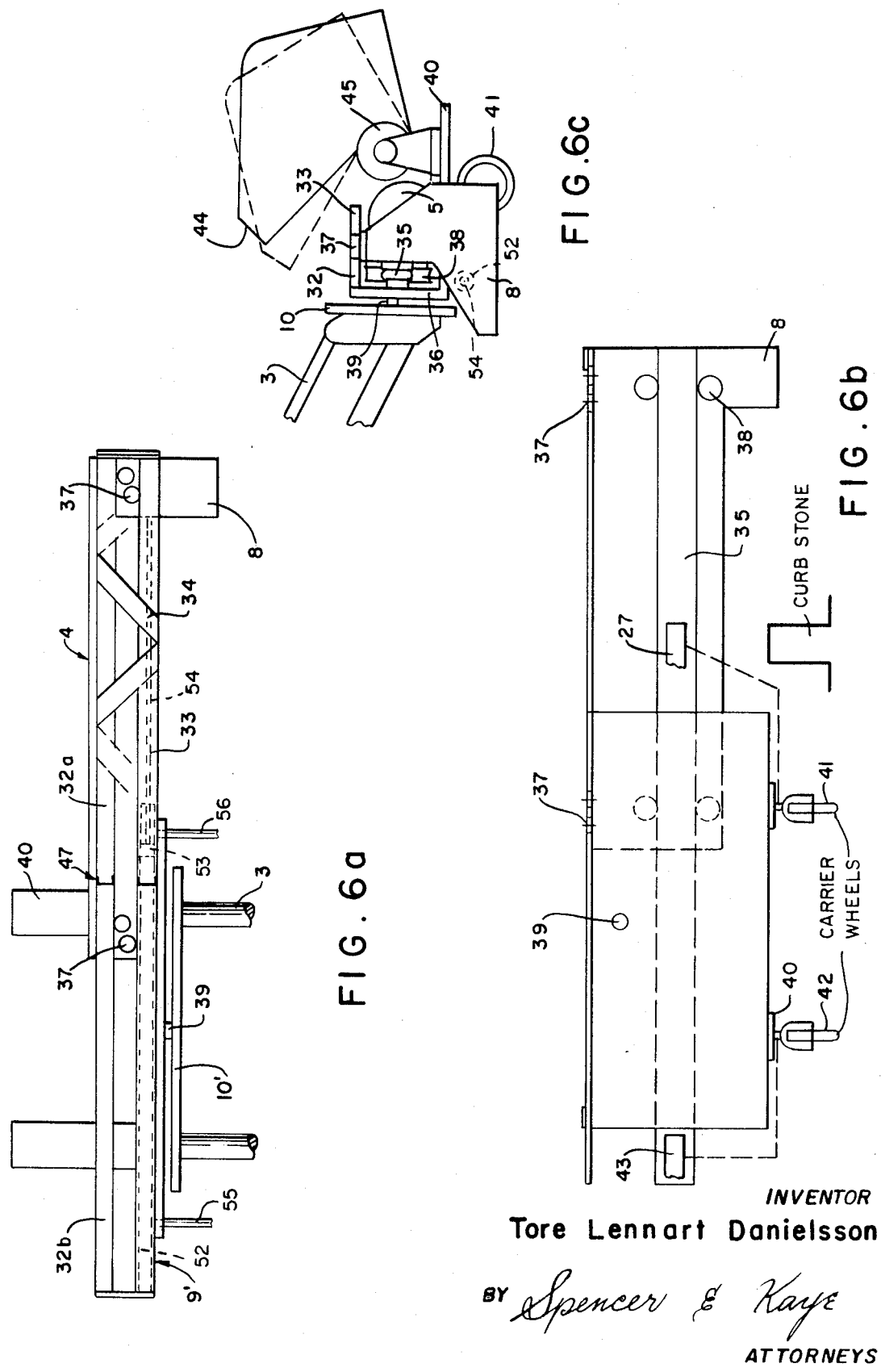

MATERIAL SPREADING APPARATUS

BACKGROUND OF THE INVENTION

The present invention relates to an apparatus for more or less automatically spreading out gravel, asphalt, rolled bitumen and similar materials over large areas such as roads and pavements. The apparatus is especially, but not exclusively intended for covering pavements with such materials.

In spite of the increasing mechanization it is in many cases still necessary to make use of hand-power for spreading out or uniformly distributing gravel, asphalt, etc. over larger areas, which is both time and cost consuming. This is especially the case in connection with such spreading operations in which it is not possible to drive a lorry, a truck or a similar vehicle over the surface to be filled or covered with the material in question; an example thereof being pavement preparation works. At present the filling or covering of pavement is performed such that a vehicle is advanced at the side of and along the pavement; the filling material being manually shoveled onto the pavement from the vehicle. The material is then smoothened out to a layer having the desired thickness and inclination, this step also being performed manually.

SUMMARY OF THE INVENTION

The present invention relates to an apparatus capable of more or less automatically performing the above-mentioned spreading and smoothening steps. The apparatus is especially intended to be supported on a vehicle such as, for example, a tractor or a lorry which is moved along the surface to be covered; the filling material being spread out substantially perpendicular to the direction of movement of the vehicle. More specifically, the invention refers to an apparatus for spreading out gravel, asphalt and other spreadable materials over a large surface; this apparatus being characterized by, on the one hand, a material feeding unit comprising a feeder chute adapted to be continuously supplied with the material in question and in which a feed screw or worm conveyor is rotatably mounted parallel to the chute so as to convey the material to be spread out into a spreading means provided at one end of the chute, a drive motor being coupled to the feed screw so as to rotate the same, and, on the other hand, a driving and supporting unit adapted to be carried by a vehicle, the unit comprising guide means in or on which the feeding unit is displacable in the longitudinal direction, and driving means so connected to the feeding unit as to produce a reciprocating movement of the same with respect to the guide means.

BRIEF DESCRIPTION OF THE DRAWINGS

FIG. 1 is a schematic top plan view of the apparatus according to the invention disposed on a tractor;

FIG. 2 is a schematic side elevation view of the apparatus according to FIG. 1;

FIGS. 6a—c show an alternative embodiment of the apparatus according to the invention provided with means permitting automatic vertical and inclination adjustment.

DESCRIPTION OF THE PREFERRED EMBODIMENT

Figure 4:
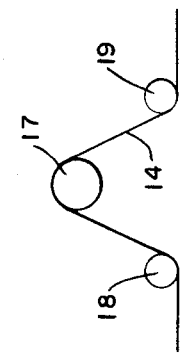
FIG. 4 shows a detail of the said apparatus.

Referring now to FIG. 1 there is shown a vehicle 1, for example a tractor, which carries an apparatus 2 according to the present invention. Said apparatus is preferably supported by the hydraulic lifting equipment 3 of the tractor, but the apparatus can also be supported by any other suitable stationary or movable support provided on the vehicle. It is, of course, also possible to make use of a vehicle which has been especially constructed for the purpose in question.

The spreading apparatus comprises a chute 4, the top portion of which is open. In said chute 4 there is rotatably mounted a feed screw 5 which is journaled in two bearings 6. One end of the shaft of the feed screw 5 is connected to a drive motor 7 adapted to bring the feed screw into rotation. The speed of rotation of the motor 7 can be controlled by the driver by means of suitable remote regulation devices. The other end of the feed screw leads to a spreading means, which may, for example, consist of a container or box 8, the top portion of which may either be open or closed the bottom portion is open. The dimensions of the box 8 in the transverse direction of the chute 4 is preferably greater than the width of the chute, the advantages obtained by the arrangement being explained later on.

The feeding unit formed by the chute 4, the feed screw 5, the drive motor 7, and the spreading means 8 is adapted to be supported by and displacable in or on a guide means 9, the longitudinal axis of which is substantially perpendicular to the direction of movement of the vehicle 1. According to the embodiment shown in FIGS. 1 to 5 the guide means 9 is disposed on a bottom plate 10. The guide means is also preferably pivotable with respect to the bottom plate 10 about an axis 11 which is substantially horizontal and perpendicular to the longitudinal axis of the guide means 9. In this case, the apparatus is preferably provided with a manually or automatically adjustable raising means 12 which may either be hydraulic, such as a piston-cylinder assembly, or mechanical, such as one or more screws or bolts resting on the bottom plate 10 and cooperating with corresponding nut threads provided on the guide means 9. The function of the raising means 12 will be explained below.

The bottom plate 10 is secured to the part 3 of the tractor 1 which supports the apparatus. In case it is not possible to raise and lower the supporting part 3 of the vehicle it is suitable to provide the apparatus with means permitting the bottom plate 10—and consequently the guide means 9 and the feeding unit—to be raised or lowered with respect to the surface to be covered with the material in question. It is, of course, also possible to raise and lower the apparatus with respect to the supporting part 3 simply by inserting suitable spacers between said part and the bottom plate 10.

In the embodiment shown in FIGS. 1 to 4 of the drawings, the reciprocating movements of the chute 4 along the guide means 9 are caused by and controlled by a reversible motor 13 which drives the chute 4 either directly or via a coupling or transmission element. In this embodiment the motor 13, which is rigidly secured either to the guiding means 9, the bottom plate 10, or the vehicle 1 supporting the apparatus, engages a chain 14, the outward ends of which are secured to the chute 4 at 15 and 16. There is shown in FIG. 4 how the engagement between the driving gear 17 of the motor and the chain 14 can be secured by means of two idle gears 18 and 19.

A person having ordinary skill in the art can easily image several other possibilities of obtaining the reciprocating movement of the feeder chute in place of the chain mentioned above. One practical, suitable way of producing this movement is to make use of reciprocating piston which compared with the chain has the advantage that it is not subjected to as much wear when fouled with, for example, gravel or asphalt.

Figure 3:
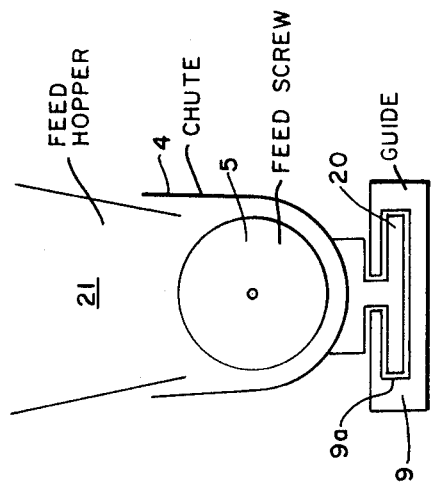
FIG. 3 is a schematic cross section view of the apparatus according to FIGS. 1 and 2.

In FIG. 3 which is a schematic, cross-sectional view of the apparatus according to the present invention, there is shown a possible embodiment of the guide means 9. According to this embodiment the guide means 9 consists of an elongated plate or bar of rectangular cross section which is provided with a T-shaped groove 9a cooperating with a T-shaped flange 20 provided on the underneath side of the chute 4. The guide means 9 may also be provided with a pair of parallel T-grooved cooperating with a pair of T-flanges or constructed in any other suitable manner which is previously known in connection with guide means for sliding or rolling motion. When utilizing the embodiment shown in FIGS. 1 to 3 in which the guide means is disposed under the feeding chute, the length of the guide means must be so adjusted that the guide means does not interfere with the translational movements of the chute 4 and the spreading means 8; said movements being described in more detail in the following.

The above-described apparatus operated in the following manner:

At first, the bottom plate 10 is rigidly secured to the supporting and loading vehicle 1; preferably on a hydraulic lifting equipment 3 of the vehicle. The vehicle 1 is loaded with gravel, asphalt compounds for roads, or whatever material is to be spread out, and the material is supplied to the feeder chute via a feed hopper 21 or a similar device which opens within or above the chute 4 but is free therefrom such that the reciprocating motion of the chute will not be obstructed by the hopper. By means of a vibrating table, one or more feed screws, or some other conventional conveying device the material in question is successively fed into the hopper 21 and therefrom into the chute 4. Due to the rotation of the feed screw 5 produced by the motor 6 the material is advanced within the chute from the outlet of the hopper to the spreading means 8, which is preferably filled or at least half-filled as long as the apparatus is in operation, thereby serving as a reservoir ensuring that also individual holes appearing in the surface to be covered be completely filled with material.

The spreading out of the material begins by starting the reversible motor 13. If the starting position of the apparatus is the position shown in full lines in FIGS. 1 and 2 the motor starts to operate in such a direction that the chute 4 and the spreading means 8 are moved towards the position shown in dotted lines, whereupon the direction of rotation of the motor is reversed and the movable assembly including the chute 4 and the spreading means 8 is brought back to the position indicated in full lines, etc. The reversion of the direction of rotation of the motor 13 can either be performed manually, such as by remote control from the driver's seat, or automatically. In the latter case, it is suitable to utilize detector means 50 provided on the guide means 9—or on the bottom plate 10— and cooperating with adjustable indicator means such as pins or studs 51 provided on the chute 4. Said detector means are connected to the motor 13 so as to reverse the direction of rotation thereof when the indicator means contact the detector means. By adjusting the position of the indicator means along the chute 4 or the guide means 9 it will then be possible to vary the end positions of the displacement of the movable assembly in or on the guide means 9, i.e. the amplitude of the reciprocating motion of the assembly, and thereby to change the width of the surface covered with the material.

Figure 7:
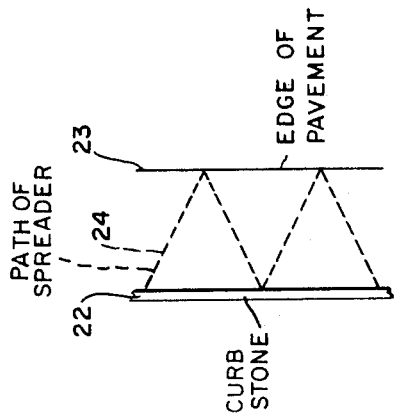
FIG. 7 illustrates schematically the mode of operation of the apparatus.

The vehicle is preferably moved forward continuously, but it can also be advanced step-by-step, if desired. During continuous operation the spreading means 8 will follow the substantially zigzag-shaped path which is illustrated in FIG. 7. In said figure 22 designates the curbstone of a pavement, 23 indicates the opposite side edge of the pavement, and 24 diagrammatically illustrates the path of the spreading means 8 when the vehicle is moved forward at constant speed. The bottom edges of the spreading means 8 are preferably parallel to the guide means 9 and—during operation—disposed at a distance above the surface to be covered corresponding the desired level of the layer to be formed by the material. Due to the above-mentioned detail 12 the guide means 9—and consequently the chute 4 and the spreading means 8—may be adjusted so as to form different angular positions with respect to the bottom plate 10 and the supporting means 3 of the vehicle. The possibility of making such an adjustment is of great importance when filling or covering pavements, which should usually present an inclination of 1:40 with respect to the horizontal plane.

As the bottom edges of the spreading means serve as a stripper or equalizer for the material which has been spread out, i.e. said edges make sure that the material forms a covering layer having the desired thickness and presenting a smooth surface, it is possible to operate the adjustment means 12 so as to give the layer of material the desired inclination. The stripping or equalization of the material by means of the bottom edges of the spreading means can also be completed by or replaced by a separate stripper which is preferably secured to the guide means 9, the bottom edge of said stripper being parallel to said guide means. The stripper is in this case disposed behind the chute 4—viewed in the direction of movement of the vehicle 1—and preferably in alignment with the bottom edges of the spreading means.

As previously mentioned, the spreading means 8 preferably presents larger dimensions in the transverse direction of the chute 4 than the width of said chute, the reason therefore being that the maximum speed of the vehicle carrying the apparatus depends directly on the dimensions of the spreading means 8 measured in said direction (here called the length of the spreading means); it being assumed that the speed of the reciprocating movement of the chute 4 is given and that the entire surface is to be covered by the spreading means 9. Under these conditions the maximum speed with which the vehicle supporting the apparatus can be advanced is limited to a value corresponding to the length of the spreading means divided by the time required for the chute to produce one complete reciprocating movement. By utilizing the above-mentioned stripper it is sometimes possible to renounce the requirement that the spreading means should pass over the entire surface to be covered with the material, thereby making it possible to increase the speed of the vehicle. The bottom edge of the stripper is in this case disposed at a level corresponding to the desired thickness of the layer of material, whereas the spreading means is adjusted to a suitable higher level. When operating the apparatus in this manner the stripper "smoothens out" the layers of material spread out from the spreading means, said layers not covering the entire surface to a covering layer of the desired thickness which completely covers the surface.

In order to ensure that the feeding out from the spreading means be as efficient as possible a vibrator 26 may be provided on the spreading means, which may also be provided with a suitable conveying device such as a feed screw, adapted to convey the material to those parts of the spreading means which are remote from the location at which the chute 4 opens into the spreading means.

When it is desired to spread out such materials as asphalt compounds for roads and pavements there may occur some difficulties in advancing the material in the chute 4 due to the fact that the material in question is too cold. A suitable way of solving this problem is to provide a heating device 25, such as a LP-gas burner, on the bottom plate 10. When the chute 4 and the asphalt contained therein during the reciprocating movements pass in front of the burner 25 the asphalt is heated which makes it easy to advance the material to the spreading means 8.

When filling and covering pavements the upper edge of the curbstone determines the level of the different filling and covering layers. It is thus important that the vertical adjustment of the apparatus be performed with respect to the upper edge of the curbstone. This is of particular importance when the road on which the vehicle carrying the apparatus is advanced is uneven.

Figure 5:
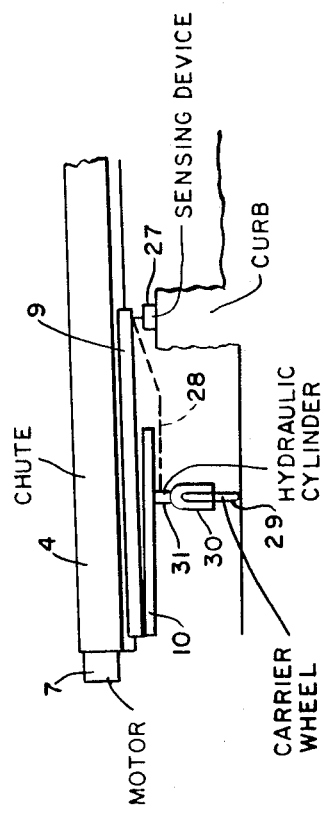
FIG. 5 is a schematic view showing the apparatus according to the invention provided with an arrangement for automatic vertical adjustment.

For this purpose the device illustrated in FIG. 5 can be utilized, said device comprising sensing means 27 supported by the guide means 9 or by some other element arranged parallel to the guide means. A suitable sensing means 27 is described in detail in connection with the embodiment of FIGS. 6a, 6b and 6c. The function of the sensing means 27 is, on the one hand, to detect the distance between the guide means 9 and the upper edge of the curbstone, and for this purpose the sensing means 27 may be provided with a foot portion contacting said edge and, on the other hand, to transfer the result of the distance detection to a device adapted to raise or lower the spreading apparatus when the sensed distance deviates from a preset value. The contact surface of said foot portion is preferably made relatively large in order to avoid sensing of surface variations in the upper edge of the curbstone. The variations in said distance may, for example, be detected by means of a piston which is rigidly secured to the foot portion and which is slidable in a cylinder which is in turn secured to the guide means 9. Said cylinder is preferably connected to a hydraulic system which automatically performs the desired raising and lowering of the apparatus depending on the pressure variations appearing in the system due to variations in the depth of penetration of the piston in the cylinder when the detected distance varies. The hydraulic system may, for example, comprise a conduit 28 ending in a cylinder 31 which is secured to the bottom plate 10. A piston supporting one or more carrier wheels 29 by means of one or more forks 30 is slidable in the cylinder 31. The apparatus is in this case preferably carried by the vehicle 1 in such a manner, that there exists a vertical play within a range of some centimeters; the fine adjustment being performed within said range by means of the above-described device.

A preferred embodiment of the apparatus according to the invention is illustrated in FIGS. 6a, 6b and 6c. As distinguished from the above-described embodiment the guide means 9' in this case extends all the way to the outer end of the spreading means 8, thereby making it possible to support and guide the assembly comprised by the feeder chute 4 and the spreading means along the entire length thereof. As the outer end of the feeder unit is in this case supported and guided during the whole reciprocating movement thereof it is possible to make said unit shorter, and in consequence thereof lighter, thereby making it possible to increase the speed of the reciprocating motion of said unit and to improve the stability of the construction. Another advantage obtained by this construction is to avoid that the end of the chute 4 opposite to the spreading means 8 in the retracted position projects from the carrier vehicle and blocks the entire roadway when the apparatus is used for covering pavements.

The guide means may for this purpose be constructed in a number of ways, such as two parallel tubes or bars disposed at a certain distance from each other in a horizontal plane. The distance between the tubes or bars should be somewhat greater than the length of the spreading means 8. Said means 8 is in this case provided with one or more pairs of guide pulleys or rollers at each end, one pulley in each pair being disposed above the respective bar and the other pulley under said bar. The end of the feeder chute remote from the spreading means is in the same manner provided with corresponding pairs of pulleys mounted astride of each bar. The feeder unit is in this manner displacable on the guide means formed by the two bars or tubes, and as the distance between the bars serving as "rails" is greater than the length of the spreading means 8 said means can freely pass between the "rails" which may have circular or rectangular cross section.

Another and preferred embodiment of the guide means is schematically illustrated in FIGS. 6a, 6b and 6c, in which the guide means supports and guides the feeder unit laterally and from above. In the embodiment shown the guide means 9' is made as an L-structure which minimizes the risks of bending of the guide means when the feeder unit is in its outer position. Said L-structure comprises two parallel upper tubes 32 and 33 which preferably have rectangular cross section. Said tubes are disposed at a certain distance from each other and united in any suitable manner, such as by flat bars 34 which are welded on the tubes 32, 33 to form a zigzag pattern. Said L-construction further comprises a vertical portion comprising a tube 35 similar to the tubes 32 and 33 and disposed at a certain distance from the horizontal tube 32. The vertical tube 35 is secured to a rigid plate 36 which completes the L-profile of the guide means 9'.

According to this embodiment the feeder unit is provided with upper guide rollers 37 and lateral guide rollers 38. The upper rollers 37 are disposed in the space between the upper tubes 32, 33 of the guide means 9' and adapted for engagement with said tubes. The upper rollers 37 preferably form sets of two rollers, one of which being applied against the tube 32 and the other being applied against the tube 33. The lateral rollers or pulleys 38 also form sets of two rollers, one of which engaging the upper edge of the vertical tube 35 of the guide means 9' and the other engaging the lower edge of said vertical tube.

The feeder unit is provided with a set of upper guide rollers or pulleys 37 and a set of lateral guide rollers 38 at each end, but it can, of course, also be provided with one or more sets of intermediate rollers, if necessary.

In the embodiment shown in FIG. 6a—c, the bottom plate 10 is replaced by a vertical side plate 10' which is preferably secured to the hydraulic lifting device 3 of the carrier vehicle 1. The guide means 9', or a support structure for said means, is pivotably journaled on the side plate 10'—or on some intermediate element—by means of a horizontal journal 39, the function of which will be explained in the following.

The assembly comprising the guide means 9' and which is pivotable about the journal 39 also comprises a lower support 40 for two carrier wheels 41 and 42 supporting the spreading apparatus. Each carrier wheel is adapted for vertical adjustment with respect to the guide means 9', thereby making it possible to raise or lower the spreading means 8 with respect to the surface to be covered with the material in question. As in the embodiment shown in FIGS. 1 to 5, there is provided a distance sensing means 27 adapted to detect variations in the distance to the curbstone of a pavement and to act upon the vertical adjustment system of the apparatus so as to raise or lower the same when variations in said distance are detected. As shown, the sensing means 27, which may be electrical or optical as well as mechanical, is adapted to act upon the wheel 41 whereas the second wheel 42 is adapted to be acted upon by an inclination instrument 43 such as a gyro instrument. Said instrument 43 is adjusted so as to raise or lower the second carrier wheel 42 when the guide means 9' deviates from a preset angle with respect to the horizontal plane. The combination of sensing means 27 and inclination instrument 43 makes it possible to control the level of the layer of material with respect to the upper edge of the curbstone, on the one hand, and the angle of inclination of the layer of material, on the other hand. Thus, if during operation the wheel 42 should fall down into a hole in the road the distance between the curbstone and the sensing means 27, as well as the angle of inclination with respect to the horizontal plane, would deviate from the preset values. The sensing means would immediately give a signal to the system for vertical adjustment of the wheel 41 which would in turn start lowering said wheel. At the same time inclination instrument 43 gives a signal indicating that the second wheel 42 should be raised. It should in this connection be noted that the lifting device 3 of the vehicle 1 producing the forward motion of the entire apparatus is not set to a stationary vertical position, but it is capable of being raised and lowered together with the entire apparatus.

In the same manner as the apparatus according to FIGS. 1 to 5 the apparatus illustrated in FIGS. 6a, 6b and 6c is provided with a motor for bringing the feed screw into rotation, and with a reversible motor or a reciprocating piston for producing the reciprocating motion of the feeder unit, a hydraulic cylinder 52, with a piston 53, piston rod 54, and fluid inlets 55 and 56 is shown in FIGS. 6a and 6c, the piston-cylinder unit is attached between support 48 and spreader 8. Said motors together with the raising and lowering systems for the carrier wheels 41 and 42 are preferably driven by the hydraulic system available in the carrier vehicle 1 by means of suitable components such as pumps and different types of electrovalves.

It has previously been mentioned that the material in question can be supplied to the feeder chute 4 directly from the carrier vehicle. It is, however, in many cases more suitable to provide the apparatus with a separate container or pocket 44 which is schematically illustrated in FIG. 6c. This pocket is carried by the structure supporting the carrier wheels 41 and 42 and it preferably contains a feed screw 45 which is parallel to the feed screw 5 of the feeder unit. The function of said feed screw 45 is to advance the material within the pocket 44 to an outlet at the lower portion of the lateral wall of the pocket which is located nearest the spreading means 8 of the feeder unit. From said outlet the material passes into the feeder chute 4 at a location which can be rather close to the spreading means 8 when the feeder unit is in the retracted position. The feed screw 45 is driven by, for example, a hydraulic motor 46 which is disposed outside the pocket 44 and preferably also driven by the hydraulic system of the vehicle 1.

In order to make the apparatus easy to transport the outwardly projecting tubes 32, 33 and 35 of the guide means 9' can be designed as telescopic tubes each consisting of an outer tube such as 32a which is adapted for telescopic motion on an internal tube such as 32b, the connection between these tubes being intimated at 47. The telescopic tubes also comprise locking means adapted to secure the outer and internal tubes to each other in any position. By utilizing this telescopic arrangement it will also be possible to adjust the length of the guide means 9' with respect to the width of the surface to be covered with the material in question.

The speed of rotation of the feed screw 5 advancing the material to the spreading means 8 can be controlled by the driver of the vehicle 1 who supervises the level of the material in the chute 4 and controls the speed of rotation of the drive motor 7, thereby ensuring that the supply of material will neither take place too slowly nor too rapidly. It is, however, preferably to make use of level sensing means adapted to detect the level of the material within the chute 4 and to actuate the drive motor 7 so as to maintain a constant level of material in the feeder chute. As a precautionary measure the coupling between the motor 7 and the feed screw 5 can be made such that the driving engagement between said motor and said screw ceases when the torque becomes unduly high.

The invention is not limited to the above-described embodiments, but a great number of modifications and variations can be imagined by a person having ordinary skill in the art without departing from the scope of the invention.

What I claim is:

1. An apparatus for spreading out a material over a large surface, comprising in combination; a material feeding unit having a feeder chute defining a longitudinal axis and adapted to be continuously supplied with the material and in which a feed screw is rotatably mounted parallel to the chute and arranged to convey the material to be spread out into a spreading means provided at one end of the feeder chute, a drive motor being connected to the feed screw so as to bring the same into rotation, and a driving and supporting unit which is movable in a predetermined direction over the surface to be covered with the material, said driving and supporting unit having guide means on which the feeding unit is mounted with the longitudinal axis of said feeder chute arranged in a direction transverse to the predetermined direction of movement of said driving and support unit for displacement in the direction, transverse to the predetermined direction of movement of said driving and support unit and drive means connected to the feeding unit for producing a reciprocating motion of the same with respect to said guide means.

2. The apparatus according to claim 1, wherein said drive means is a reciprocating piston.

3. The apparatus according to claim 1, wherein said drive means is a reversible motor adapted to produce the reciprocating motion of the feeding unit by engagement with chain, the extremities of which are secured to the end portions of the feeding unit.

4. The apparatus according to claim 1, further including detector means provided on said guide means and cooperating with adjustable position indicators provided on the feeding unit, said detector means being adapted to reverse the direction of operation of said drive means each time a position indicator passes in front of a detector means, thereby also reversing the direction of the reciprocating motion of the feeding unit.

5. The apparatus according to claim 1, further including distance sensing means provided on the guide means and adapted to detect deviation in the distance between the sensing means and the upper edge of the curbstone of the pavement with respect to a preset distance value, said sensing means being so connected to a device for vertical adjustment of the spreading apparatus as to raise or lower the apparatus when the sensed distance deviates from the preset value in order to keep said distance constant.

6. The apparatus according to claim 5, wherein said vertical adjustment means comprises a set of at least one carrier wheel supporting said driving and guiding unit and adapted to raise and lower the same by means of a hydraulic piston-cylinder assembly.

7. The apparatus according to claim 6, wherein said driving and supporting unit is pivotable about a horizontal axis and provided with an inclination instrument adapted to be set to a predetermined angular value with respect to the horizontal plane, a second device for vertical adjustment of the spreading apparatus being adapted to be acted upon by said instrument so as to raise or lower the apparatus when the angular position of said driving and supporting unit deviates from said preset value.

8. The apparatus according to claim 7, wherein said first vertical adjustment means comprises a set of at least one carrier wheel actuable by means of a hydraulic piston-cylinder assembly, and wherein said second vertical adjustment means also comprises a set of at least one carrier wheel actuable by means of a second hydraulic piston-cylinder assembly, said first and second sets of wheels being disposed on opposite sides of vertical line through said horizontal axis.

9. The apparatus according to claim 1, wherein the length of said guide means is sufficient for supporting and guiding the spreading means of the feeding unit in the outer position thereof.

10. The apparatus according to claim 9, wherein the guide means comprises a L-structure the horizontal portion of which is disposed above the feeding unit and the vertical portion of which is disposed above the feeding unit and the vertical portion of which is disposed at the side of said unit, and in that the feeding unit comprises at least two sets of upper guide pulleys located in the space between two parallel tubes secured to the horizontal portion of the L-structure and adapted for engagement with said tubes, and at least two sets of two lateral pulleys, one of which engaging the upper edge of a tube secured to the vertical portion of the L-structure and the other engaging the lower edge of said tube.

11. The apparatus according to claim 1, wherein the dimensions of the spreading means in the transverse direction of the feeder chute is greater than the width of said chute.

12. The apparatus according to claim 1, further including a container member fixedly supported on said driving and supporting unit, and defining a bottom portion and having a sidewall defining an opening, and an additional feed screw mounted at the bottom portions of said container member and arranged parallel to said feed screw in said feeder chute, said additional feed screw being further arranged to convey the material into said feeder chute through the opening in the sidewall of said container member.

13. The apparatus according to claim 12, wherein said guide means has a plurality of tube members which are dimensioned for telescoping engagement with one another, and locking means associated with said tube members for securing the tube members to one another in any position with respect to one another.